Feb. 20, 1968  B. MAZELSKY  3,369,634
ABSORBING DEVICE
Filed June 17, 1966  7 Sheets-Sheet 1

INVENTOR
BERNARD MAZELSKY
BY Herzig, Walsh & Blackburn
ATTORNEYS

Feb. 20, 1968  B. MAZELSKY  3,369,634
ABSORBING DEVICE
Filed June 17, 1966  7 Sheets-Sheet 2
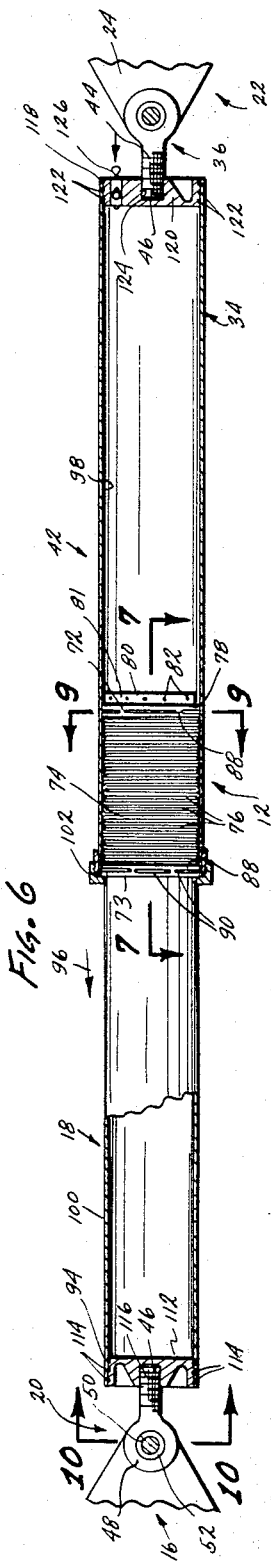
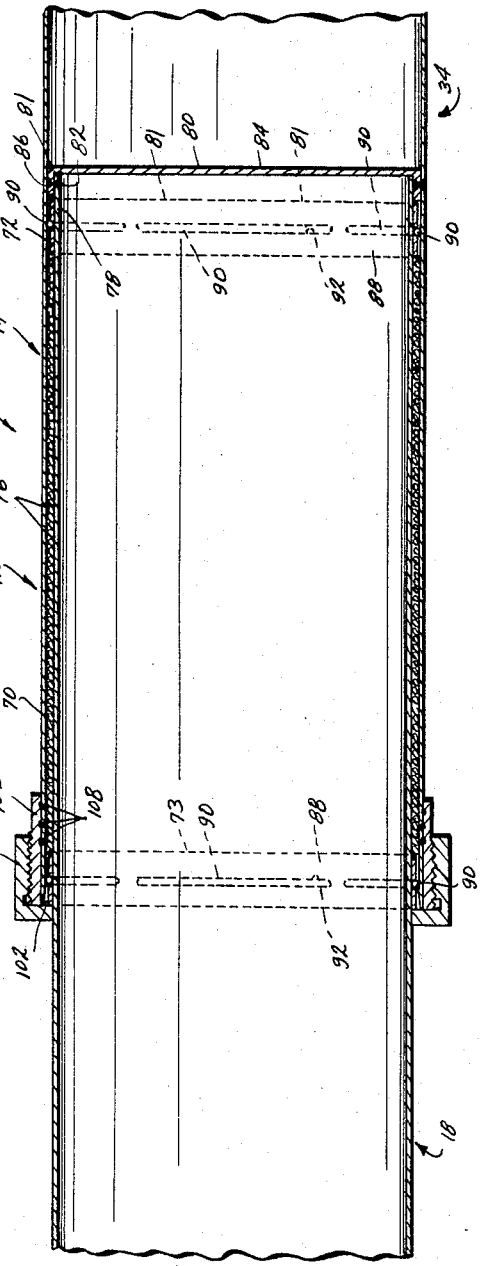
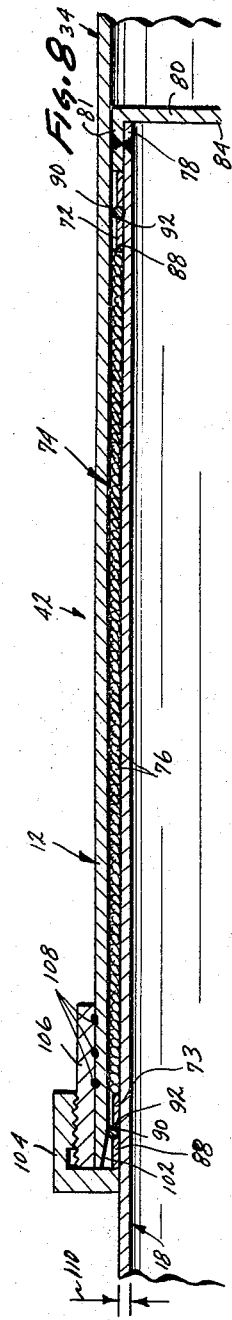
INVENTOR
BERNARD MAZELSKY
BY Herzig, Walsh + Blackburn
ATTORNEYS

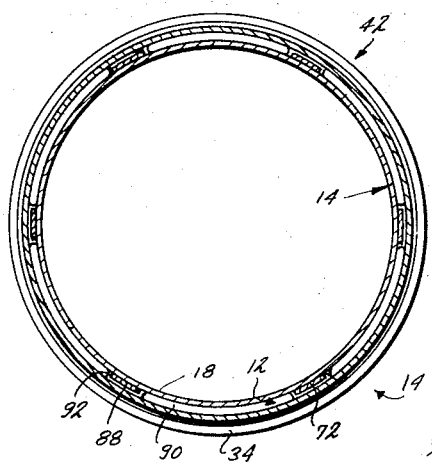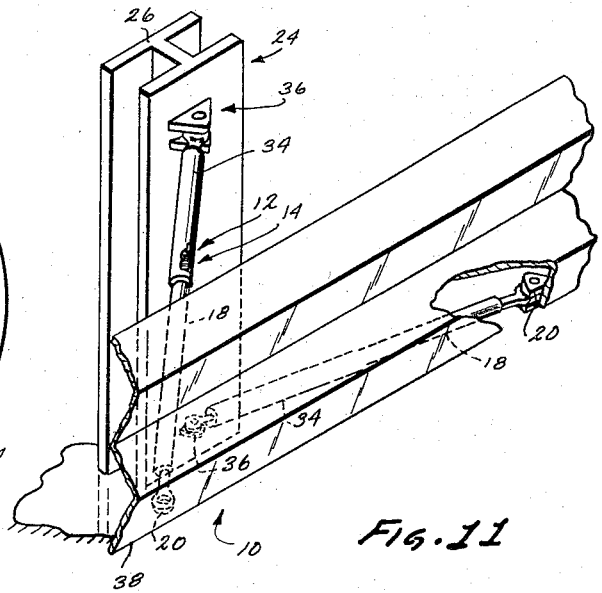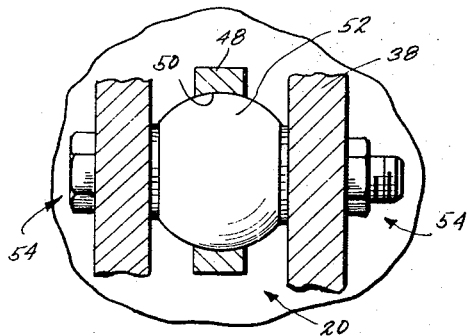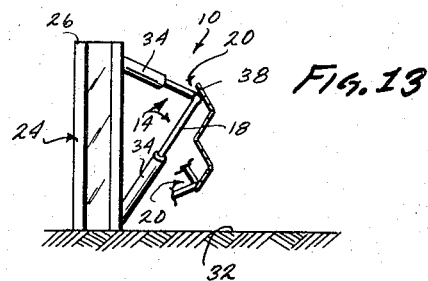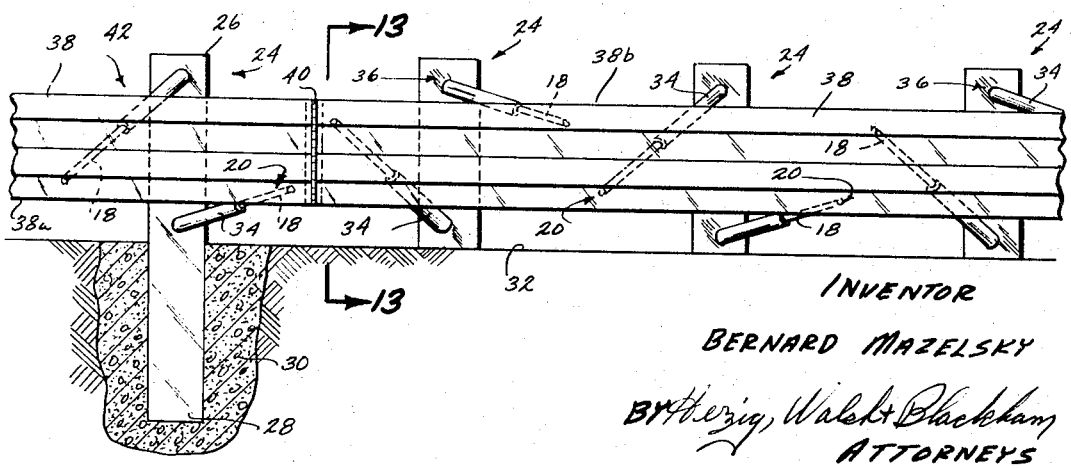

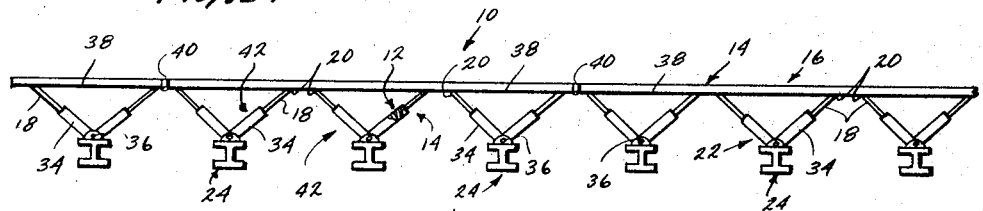
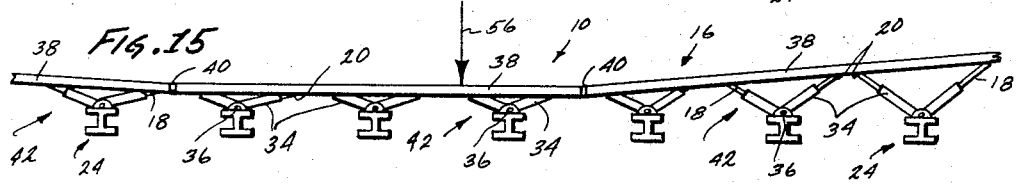
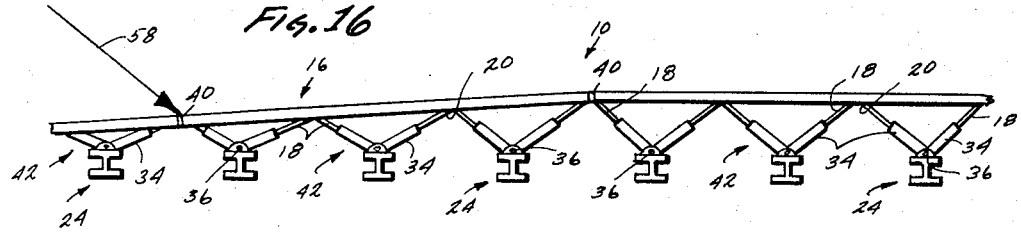
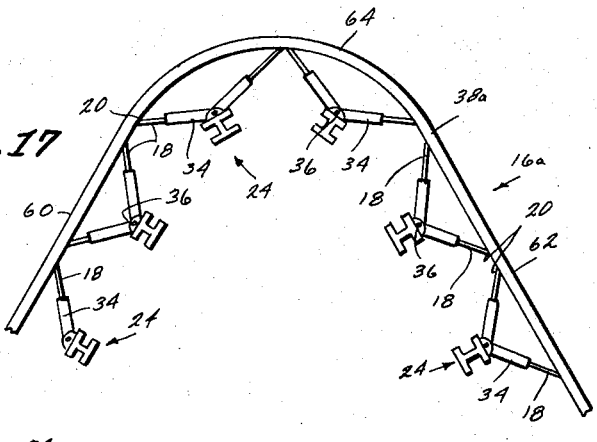
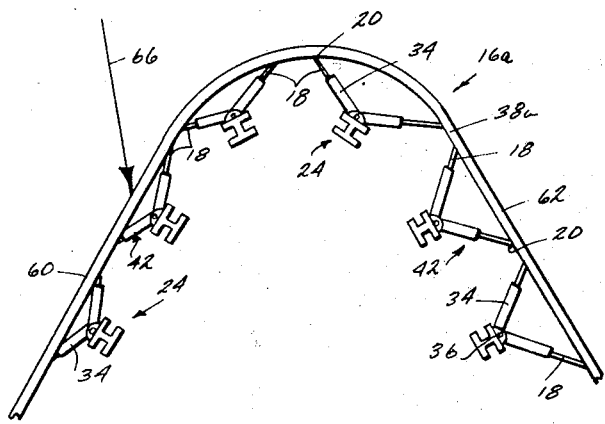

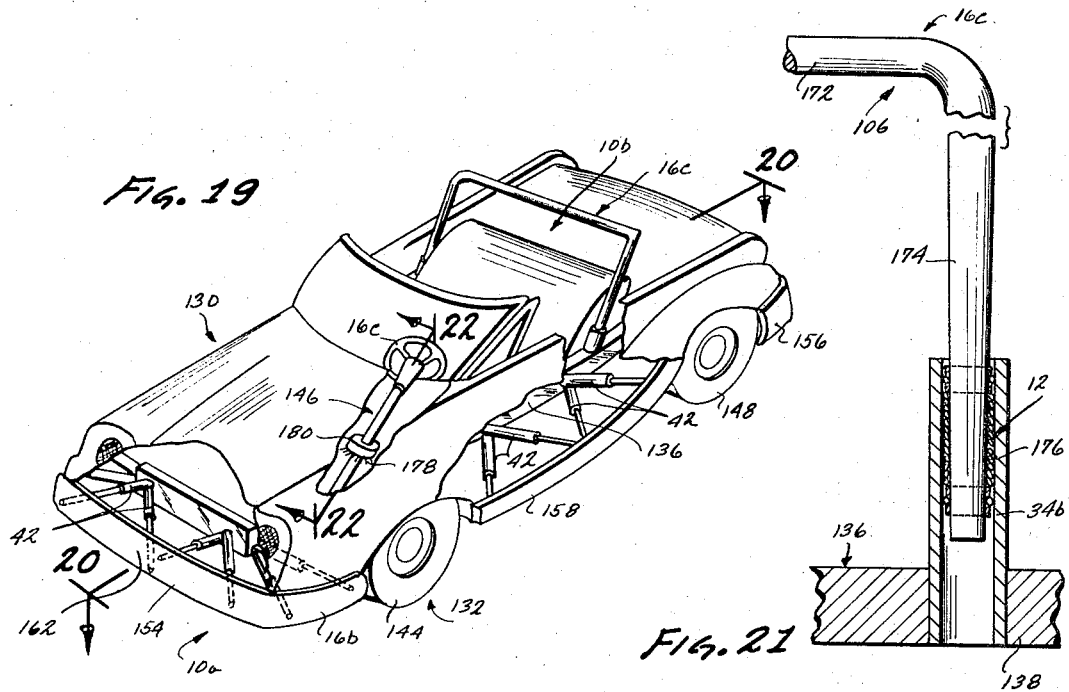
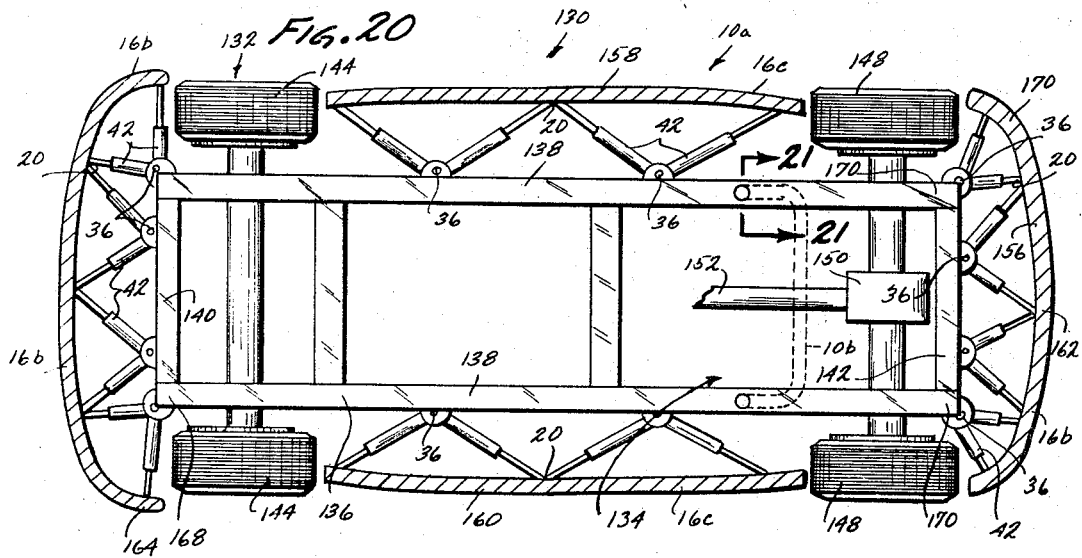

Feb. 20, 1968  B. MAZELSKY  3,369,634
ABSORBING DEVICE
Filed June 17, 1966  7 Sheets-Sheet 6
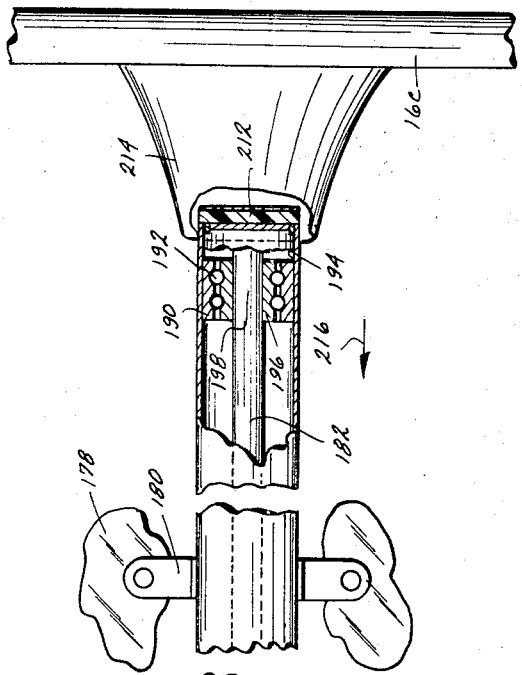
Fig. 22
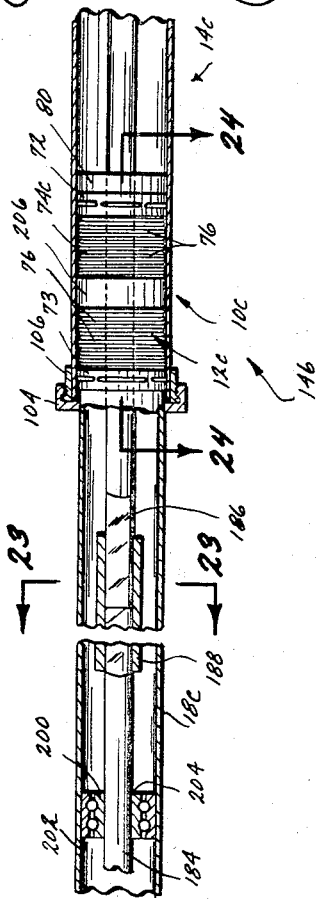
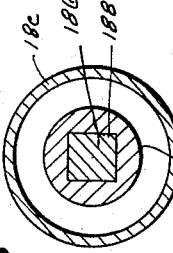
Fig. 23
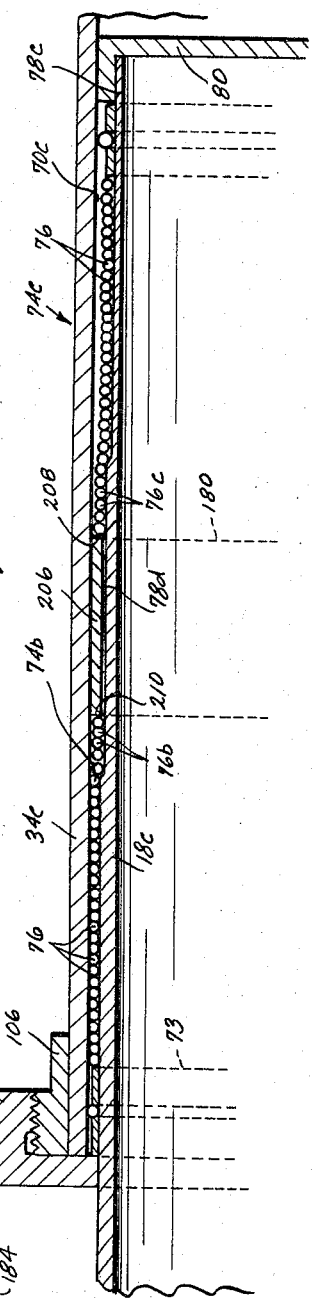
Fig. 24
INVENTOR
BERNARD MAZELSKY
BY Herzig, Walsh & Blackheim
ATTORNEYS Feb. 20, 1968     B. MAZELSKY     3,369,634
ABSORBING DEVICE
Filed June 17, 1966     7 Sheets-Sheet 7
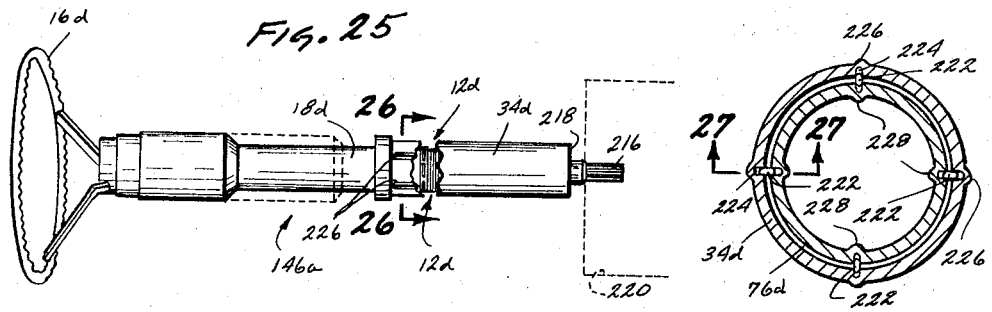
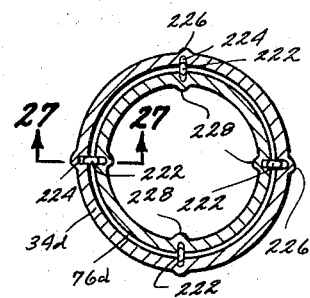
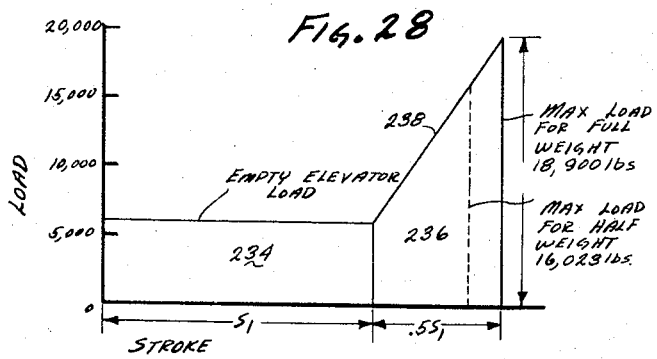
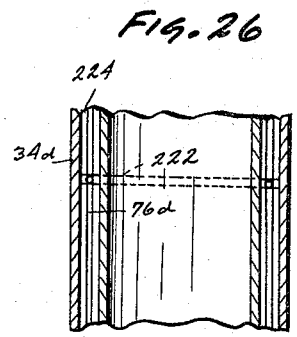
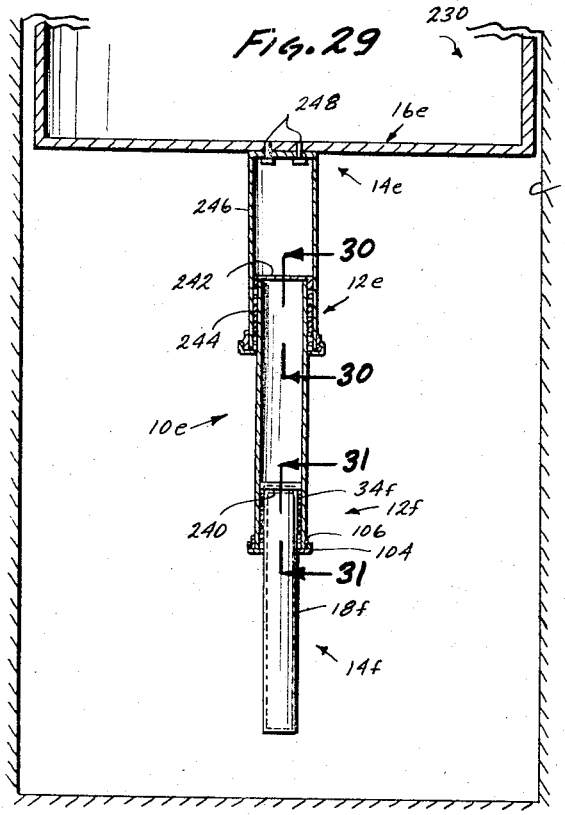
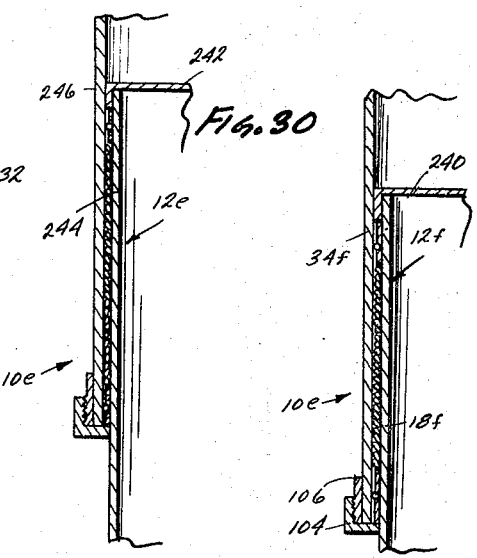
INVENTOR
BERNARD MAZELSKY
ATTORNEYS United States Patent Office 3,369,634
Patented Feb. 20, 1968

3,369,634
ABSORBING DEVICE
Bernard Mazelsky, West Covina, Calif., assignor to
Ara, Inc., a corporation of California
Filed June 17, 1966, Ser. No. 558,317
15 Claims. (Cl. 188—1)

ABSTRACT OF THE DISCLOSURE

An energy absorbing body and means for cyclically and plastically deforming portions of the body in reverse directions in response to unidirectional movement of an impact member, and means for subjecting additional portions of the body to cyclic deformation in response to continued movement of the impact member.

The present invention relates to a new and useful energy absorbing device and more particularly to an improved device of the type disclosed in Patent No. 3,231,049 wherein unidirectional mechanical energy is absorbed by the cyclic plastic deformation of a solid material.

As used herein, the term "mechanical energy" may be defined according to its conventional definition, i.e., a force acting through a distance. Also, as used in the present application, the term "cyclic plastic deformation" refers to the deformation of any solid material around a hysteresis curve, as illustrated in FIGURE 21 of said Patent No. 3,231,049. In addition, the terms "arcuate body," "toroidal body" and "helical body" shall include any body which may be operated upon to cause cyclic plastic tension deformation and compression deformation.

While generally satisfactory, energy absorbing devices of the type disclosed in said Patent No. 3,231,049 have the limitation that rate of change of energy absorption remains substantially constant during the stroking distance of the absorber; that is, the attenuation force is constant with stroking distance.

In view of the foregoing, it is a primary object of the present invention to provide a new and useful energy absorbing device not subject to this limitation and including means for increasing the rate of change of energy absorption of the device by increasing or decreasing the attenuation during the stroking distance of the absorber.

Another object of the present invention is to provide a new and useful energy absorbing device of the type described which includes a vehicle steering mechanism.

Yet another object of the present invention is to provide a new and useful energy absorbing device of the type described which includes an automobile bumper.

A further object of the present invention is to provide a device of the type described which includes a highway barrier.

A still further object of the present invention is to provide a new and useful elevator-arresting device.

Another object of the present invention is to provide a new and useful roll-bar for an automobile.

Another object of the present invention is to provide an energy absorbing device wherein energy is absorbed by causing cyclic plastic tension deformation and compression deformation in an energy absorbing body.

According to the present invention, an energy absorbing device is provided which comprises a cycling and energy absorbing means in the form of a solid body adapted to absorb energy by cyclic plastic tension deformation and compression deformation and an energy transmitting means for imposing on the cycling and energy absorbing means this deformation in response to mechanical energy applied thereto. The device is shown herein for purposes of illustration, but not of limitation, in combination with an automobile steering wheel, an automobile roll-bar, an automobile bumper, a guard rail and an elevator retarding device. The device includes means for increasing the rate of change of energy absorbed by the device during the stroking distance of the device by having the attenuation force increase or decrease with the stroking distance.

The features of the present invention which are believed to be novel are set forth with particularity in the appended claims. The present invention, both as to its organization, and manner of operation, together with further objects and advantages thereof, may be best understood by reference to the following description, taken in connection with the accompanying drawings in which like reference characters refer to like elements in the several views.

In the drawings:

FIGURE 6 is a longitudinal, cross-sectional view of a portion of an energy absorbing device constituting a first embodiment of the present invention;

FIGURE 7 is an enlarged, partial, cross-sectional view taken along line 7—7 of FIGURE 6;

FIGURE 8 is a view similar to FIGURE 7 showing a portion thereof on a greatly enlarged scale to bring out certain details of construction;

FIGURE 9 is an enlarged, cross-sectional view taken along line 9—9 of FIGURE 6;

FIGURE 10 is an enlarged, partial, cross-sectional view taken along line 10—10 of FIGURE 6;

FIGURE 11 is an enlarged, partial, perspective view of a guard rail which is shown in FIGURES 14–16 and which constitutes a first embodiment of an energy absorbing device of the present invention in combination with the portion of the device shown in FIGURE 6;

FIGURE 12 is an enlarged, partial front-elevational view of the guard rail shown in FIGURES 13–16;

FIGURE 13 is an enlarged, partial cross-sectional view taken along line 13—13 of FIGURE 12;

FIGURES 14–16 are plan views showing the guard rail of FIGURE 12 before impact, after a head-on impact and after an oblique impact, respectively;

FIGURES 17 and 18 are plan views of a guard rail of the type shown in FIGURES 14–16 which may be used on curves showing the guard rail before impact and after an oblique impact, respectively;

FIGURE 19 is a perspective view, with parts broken away to show internal construction, of an automobile employing energy absorbing devices of the present invention in combination with automobile bumpers, a steering column and a roll-bar, respectively;

FIGURE 20 is an enlarged, cross-sectional view taken along line 20—20 of FIGURE 19;

FIGURE 21 is an enlarged, partial cross-sectional view taken along line 21—21 of FIGURE 20;

FIGURE 22 is an enlarged, partial cross-sectional view taken along line 22—22 of FIGURE 19;

FIGURE 23 is an enlarged cross-sectional view taken along line 23—23 of FIGURE 22;

FIGURE 24 is an enlarged, partial cross-sectional view taken along line 24—24 of FIGURE 22;

FIGURE 25 is a modified steering mechanism of the type shown in FIGURE 22;

FIGURE 26 is an enlarged, cross-sectional view taken along line 26—26 of FIGURE 25;

FIGURE 27 is an enlarged, partial cross-sectional view taken along line 27—27 of FIGURE 26;

FIGURE 28 is a graph showing the relationship of load and stroke of an energy absorbing device constituting another embodiment of the present invention;

FIGURE 29 is a cross-sectional view of an elevator employing an energy absorbing device of the present invention having the load and stroke exhibited graphically in FIGURE 28;

FIGURE 30 is an enlarged, partial cross-sectional view taken along line 30—30 of FIGURE 29; and FIGURE 31 is an enlarged, partial cross-sectional view taken along line 31—31 of FIGURE 29.

Referring again to the drawings and particularly to FIGURES 1-4, during the impact of an automobile with a stationary object, it is well known that the automobile will provide some measure of attenuation due to its permanent deformation of the bumper, radiator, frame and the like, even though some mechanism of energy absorption is not included in the automobile. If an accelerometer is placed at the steering column-wheel junction, the acceleration measured during the impact will most probably experience a half-sine wave type shape similar to that shown in FIGURE 1. Although the exact shape of the input acceleration shown is difficult to describe exactly, two parameters appear to be common to this class of input acceleration. These are the peak acceleration, $\alpha_0$, and the duration time of the acceleration $\Delta t$. From an analysis of numerous water and land impact tests, the half sine wave shape appears to represent the input acceleration curve due to crushing of the test body during impact. Assuming the crushing mechanism is similar for the automobile, a mathematical analysis of the requirements for the energy absorbing device or attenuator may be established when applied to the steering column.

Figure 1:
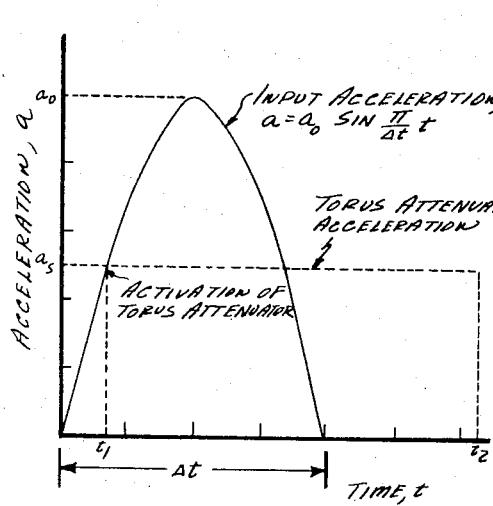
FIGURE 1 is a graph showing acceleration plotted against time.

In FIGURE 1, an energy absorbing device's acceleration curve is superimposed on the half sine wave for the purpose of illustrating the three additional parameters required to describe its mathematical characteristics. These are given as follows: At $t_1$, the device is activated at an acceleration level corresponding to $\alpha_s$, which is experienced during the input acceleration of the crash, and operates at this level until the velocity of the device is zero, which occurs at time $t_2$.

Based on the acceleration characteristics shown in FIGURE 1, a solution for the stroke requirements for the energy absorbing device may be developed as a function of three variables: the ratio of the device's acceleration to peak input acceleration, $\alpha_s/\alpha_0$; a non-dimensional acceleration ratio, $$\frac{\alpha_0 \Delta t}{\pi V_0}$$

where $V_0$ corresponds to the initial impact velocity; and a non-dimensional stroke parameter, $$\bar{s} = \frac{s}{(V_0^2/2\alpha_s)}$$

where $s$ is the stroke of the energy absorbing device stroke. The non-dimensional stroke requirement, $\bar{s}$, for the device is plotted in FIGURE 2 as a function of the other two parameters. Examination of the results of this figure indicate that, if benefits are to be derived from the attenuation caused by the crushing of the automobile, a value of $\alpha_s/\alpha_0$ equal to 0.5 or greater must be realized. In addition, if values of $$\frac{\alpha_0 \Delta t}{\pi V_0}$$

are less than unity, the benefits of attenuation due to the crushing of the automobile may be difficult to realize unless the ratio $\alpha_s/\alpha_0$ is close to unity, which is extremely impractical. Since the engineering significance of the parameter $\alpha_s/\alpha_0$ is self-explanatory, the only two parameters that require some clarification are the input acceleration prameter, $$\frac{\alpha_0 \Delta t}{\pi V_0}$$

and the stroke parameter $$\frac{V_0^2}{2\alpha_s}$$

Figure 2:
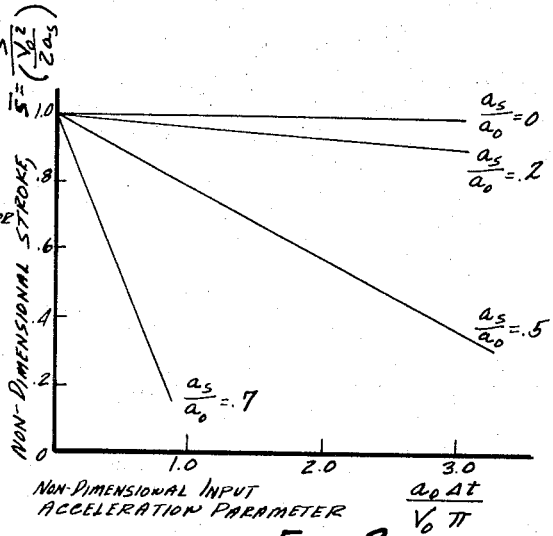
FIGURE 2 is a graph showing non-dimensional stroke plotted against a non-dimensional input acceleration parameter.
Figure 3:
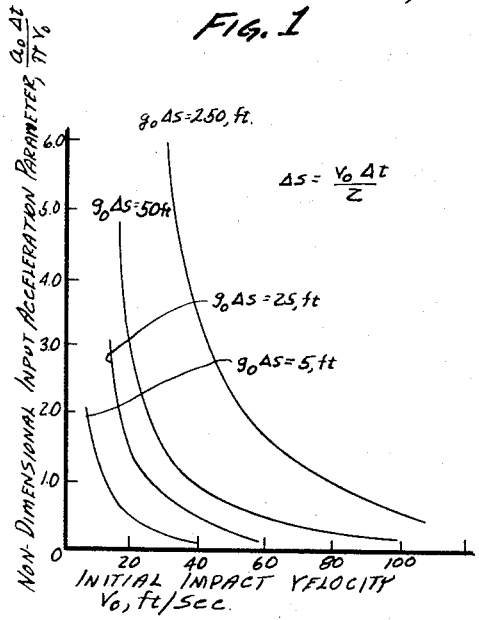
FIGURE 3 is a graph showing a non-dimensional input acceleration parameter plotted against initial impact velocity.

The first parameter, which consists of variables used to define the input acceleration curve shown in FIGURE 1, may be evaluated in terms of the initial impact velocity, $V_0$, and the parameter involving the product of the peak "g" forces, $g_0$, and the distance $\Delta_s$, which is a measure of the input velocity $V_0$ times $\Delta t$, which describes the duration of the input acceleration. The characteristics of the acceleration parameter $$\frac{\alpha_0 \Delta t}{\pi V_0}$$

are plotted in FIGURE 3 as a function of the initial impact velocity, $V_0$, and the product parameter $g_0 \cdot \Delta s$. Examination of the results of FIGURE 3 indicate that for an impact velocity less than 20 ft. per second and for reasonable values of $g_0 \cdot \Delta s$, values of the impact acceleration $$\frac{\alpha_0 \cdot \Delta t}{\pi V_0}$$

will be greater than one; however, for impact velocities from 40 to 100 feet per second, values of $g_s \cdot \Delta s$ greater than 100 must be attained or else the benefits derived from the reduction of strokes shown in FIGURE 2 due to the input acceleration parameter $$\frac{\alpha_0 \cdot \Delta t}{\pi V_0}$$

will not be realized. In more physical terms, if an input peak acceleration of 100 $g$'s is experienced during a crash, then the total permanent deformation due to the automobile bumper, radiator, frame, guard rail and the like must exceed at least one foot and possibly five feet at high impact velocities. The results of FIGURE 3 clearly indicate that for high velocity impact (in the range of 40 to 100 ft./sec.), then the attenuation of the driver through the steering column may be implemented by additional sources, such as an energy absorbing bumper or guard rail to minimize load levels and stroking distances of the driver.

Figure 4:
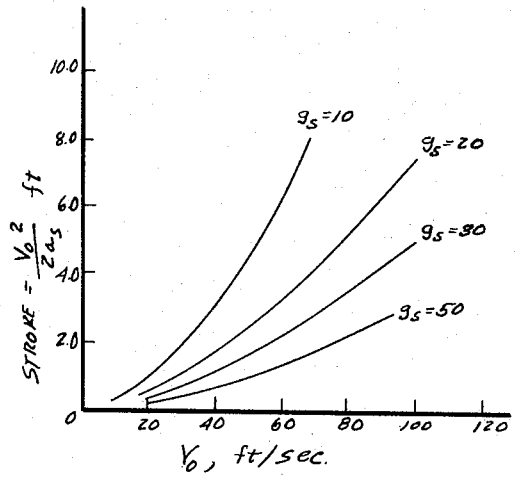
FIGURE 4 is a graph showing stroke plotted against velocity.

In order to determine the actual stroke distance required for the steering column from the parameter, $\bar{s}$, shown in FIGURE 2, a plot of the stroke parameter $$\frac{V_0^2}{2\alpha_s}$$

is provided in FIGURE 4 as a function of the impact velocity $V_0$ and several prescribed $g$ load levels of the torus attenuator located in the steering column. Once a value of the non-dimensional stroke distance $\bar{s}$ is determined from FIGURE 2, the actual stroke distance required for the attenuator is obtained by multiplying $\bar{s}$ times the value of $$\frac{V_0^2}{2\alpha_s}$$

obtained from FIGURE 4, which is a function of the impact velocity $V_0$ and the operating $g$ force of the device, $g_s$.

Through proper automotive design and/or barrier design, let it be assumed that a value of $\bar{s}=0.5$ can be obtained from FIGURE 2. For an impact velocity of 80 feet per second, which corresponds to 54.5 miles per hour, and at a $g$ level of the energy absorbing device or attenuator of 30, which according to established human tolerance criteria is acceptable without injury to the driver (in the fore and aft direction), a stroke requirement of 3×0.5=1.5 feet is required for the steering column attenuator. If the value of $\bar{s}=0.5$ cannot be obtained by proper automotive and/or barrier design, than a value of $\bar{s}=0.9$ would be realized and consequently the steering column attenuator would require almost three feet of stroke for this same impact condition. It is quite clear that where 1.5 feet of stroke in the steering column is practical and values of 3 feet or greater are not practical, then the prevention of injury to a driver at relatively high speed, namely 80 feet per second or 54.5 miles per hour, is not feasible for any steering column attenuator system unless implemented by the attenuation available from other sources.

Referring now to FIGURES 5–14, one such source of attenuation comprises a highway barrier 10 constituting a first embodiment of an energy absorbing device of the present invention and having a cycling and energy absorbing means 12 and an energy transmitting means 14.

The energy transmitting means 14 includes an impact receiving means 16, an inner tubular member 18, a first connector means 20 and a support means 22. The support means 22 includes a post 24 shown herein for purposes of illustration, but not of limitation, as comprising an H-beam having an upper, free end 26 and a lower fixed end 28. The lower fixed end 28 is preferably encased in a concrete block 30 which is buried beneath a supporting surface 32. A plurality of posts 24 may be placed on ten foot centers along a highway, represented by the surface 32, whenever highway safety dictates that a highway barrier 10 be positioned. The support means 22 also includes an outer tubular member 34 which maintains the cycling and energy absorbing means 12 in operative association with the inner tubular member 18 and maintains the alignment of the member 18 with the cycling and energy absorbing means 12. The support means 22 also includes a second connector means 36 for connecting a first tubular member 34 to the upper end 26 of each post and a second tubular member 34 to an intermediate portion 38 thereof.

The impact receiving means 16 may comprise a plurality of sections of conventional, corrugated guard rail members 38 which are hingedly connected together by suitable hinge means 40. Each guard rail member 38 may span three posts 24 and may be connected thereto by telescopically engaging an associated inner tubular member 18 into its associated outer tubular member 34 forming an attenuator assembly 42. Each attenuator 42 has a stroke of approximately 24 inches from its fully extended position to its fully compressed position where the inner tubular member 18 is substantially completely disposed within the outer tubular member 34. The attenuators 42 absorb energy in a manner to be hereinafter described by being stroked when a guard rail member 38 receives an impact from an automobile or the like. The energy absorbing capability of the attenuators 42 is such that the stroking of a particular attenuator will commence without substantial injury to a driver or passenger in the automobile and without deforming the guard rail members 38 so that the members 38 remain intact while the attenuators 42 are activated during an impact. This not only permits the guard rail members 38 to be reset after each impact by extending the attenuators 42 in a manner to be hereinafter described, but also allows for maximum stroking distance of the guard rail members 38.

Each connector means 36, 20 includes an eye bolt 44 having an externally threaded end 46 and a socket end 48. The socket end 48 includes a socket 50 in which a ball member 52 is articulately mounted for connection to an associated post 24 or an associated guard rail member 38, respectively, by a bolt and nut assembly 54 (FIGURE 10). As best seen in FIGURE 12, the posts 24 are alternately connected to the lower edges 38a and the upper edges 38b of the guard rail members 38 so that the attenuators 42 associated with a particular post 24 will be non-parallel. This non-parallel arrangement restrains the impact receiving means 16 from rolling about its major axis. Additionally, when the impact receiving means 16 is in its FIGURE A, before impact position, the attenuators form an angle of approximately 45° with the impact receiving means 16. The articulated nature of the connector means 20, 36 and the attachment of the attenuators 42 to the posts 24 and the members 38 in the manner just described assures that the stroke of the impact receiving means 16 will be approximately restricted only by the distance associated with the diameter of the attenuators 42 and not by their compressed length. In addition, this arrangement insures that the attenuators 42 and the connector means 20, 36 will remain intact regardless of the impact angle.

Figure 5:
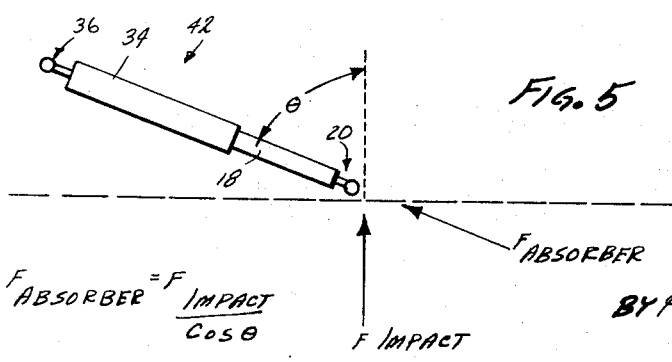
FIGURE 5 is a force diagram showing somewhat schematically an energy absorbing device of the present invention when subjected to nonaxial impacts.

Referring now more in particular to FIGURE 5, if optimum energy absorbing is to be obtained F impact should be a constant during the stroking distance of the attenuator 42. For this condition, the force, F attenuator, must necessarily increase with stroke with the variation of $$\frac{1}{\cos \theta}$$

where $\theta$ would vary possibly from 45° to 75° during the stroke. This increasing force with stroke is manufactured into the attenuators 42 in a manner to be hereinafter described. Since the impact receiving means 16 is designed not to deform permanently during the excursion of the attenuators 42, and since the attenuators work in both the tension and compression strokes, every attenuator will be operative regardless of the angle of the impact force. Thus the impact force is distributed over a maximum area of the impact receiving means 16 resulting in least likelihood of any one attenuator bottoming out.

For example, when the impact receiving means 16 is subjected to a head-on impact, as indicated by the arrow 56 in FIGURE 15, the centrally located attenuators 42 will be compressed. Were it not for the hinges 40, it is apparent that the remaining attenuators 42 would also be compressed. However, the guard rail members 38 on each side of the central member 38 receiving the impact will tend to pivot about their central post 24 with the attenuators 42 on one side thereof being compressed while the attenuators 42 on the other side thereof are extended. For this situation, then, it is apparent that, before impact, the attenuators 42 should be set in such a manner that they will absorb energy whether they are compressed or extended. This can be accomplished by inserting the inner tubular members 18 approximately halfway into their associated outer tubular members 34.

Should the impact receiving means 16 be subjected to an oblique impact, as indicated by the arrow 58 in FIGURE 16, the attenuators 42 in the vicinity of the impact will be compressed. Assuming that the impact occurs at the left hand end of the central guard rail member 38, as viewed in FIGURE 16, this central member will tend to rotate about its central post 24 causing the left hand attenuators 42 to be compressed and the right hand attenuators 42 to be extended. As the right hand attenuators 42 on the central guard rail member 38 are extended, the left hand attenuators 42 on the right hand guard rail member 38 will also be extended tending to pivot the right hand guard rail member 38 about its central post 24 to compress its right hand attenuators 42.

A modified impact receiving means 16a is shown in FIGURES 17 and 18 wherein a U-shaped guard rail member 38a is adapted to use on a curve. The guard rail member 38a includes a left hand arm 60, a right hand arm 62 and a bight portion 64. The guard rail member 38a is connected to a plurality of posts 24 by attenuators 42, both of which are identical to those shown in FIGURES 14–16. When the impact receiving means 16a is subjected to an oblique impact against the arm 60, as indicated by arrow 66 in FIGURE 18, the attenuators 42 which are connected to the arm 60 will be compressed while the attenuators 62 which are connected to the arm 62 will be extended.

Referring now more in particular to FIGURES 6–9, the inside diameter of the outer tubular member 34 is sufficiently greater than the outside diameter of the inner tubular member 18 than an annular space or chamber 70 is provided therebetween. The cycling and energy absorbping means 12 is mounted in the chamber 70 in operative association with the outer tubular member 34 and the inner tubular member 18 for absorbing energy by cycling plastic deformation and its reversed deformation in response to mechanical energy transmitted thereto by the energy transmitting means 14. The cycling and energy absorbing means 12 comprises a working cage 72, a stacking cage 73 and a solid, non-elastomeric, radially uncompressed, arcuate body in the form of a helical coil 74 having a plurality of turns 76. Each turn 76 constitutes an arcuate body adapted to be subjected to cyclic plastic tension deformation and compression deformation by the rotation of each turn 76 about its internal axis. The cycling and energy absorbing means 12 is prevented from moving past the end 78 of the tubular member 18 by a retainer cap 80 which includes a sidewall 81 encompassing the end 78, and secured thereto by suitable weldments 82, and a bottom wall 84 having a function to be hereinafter described. The sidewall 81 has an upper edge 86 engageable by the working cage 72 for preventing it from moving past the end 78.

The working cage 72 and the stacking cage 73 each includes a band 88 encompassing the inner tubular member 18 and a plurality of arcuate bodies 90 which are mounted in elongated openings 92 provided in an associated band 88.

The amount of energy absorbed by each attenuator 42 will depend, in part, upon the number of turns 76 which are rotated about their internal axes during a particular stroke. The number of turns 76 which are rotated depend upon whether or not they are brought into working engagement with the inner tubular member 18 and the outer tubular member 34 during a particular stroke. The turns 76 are programmed into working engagement with the inner tubular member 18 and the outer tubular member 34 during a particular stroke to produce the increasing force with stroke which is manufactured into each attenuator 42. This is accomplished by tapering the inner tubular member 18 a predetermined amount from its end 78 to its other end 94. Such a taper provides a varying chamber 70 resulting in the increasing force with stroke. The amount of taper depends on the length of the inner tubular member 18, its diameter and the diameter of the turns 76, as will be more fully explained hereinafter.

During a particular stroke, the working cage 72, because of the rotation of the arcuate bodies 90 about their internal axes, not only absorbs energy, but also moves the turns 76 on the helical body 74 into working engagement with the outer tubular member 34 by sliding the turns 76 along the inner tubular member 18 in the direction of arrow 96. A predetermined number of turns 76 are initially in working engagement with the inner tubular member 18 and the outer tubular member 34 so that the cycling and energy absorbing means 12 will absorb a predetermined amount of energy upon initial impact. In order to be placed in working engagement with the inner tubular member 18 and the outer tubular member 34, the inner wall 98 of the outer tubular member 34 and the outer wall 100 of the inner tubular member 18 must exert sufficient frictional force on the turns 76 to rotate them about their internal axes. At the end of the stroke, the cycling and energy absorbing means 12 may be returned to the end 78 of the inner tubular member 18 by extending an associated attenuator 42. During this extension, the stacking cage 73 assures that the turns 76 will remain neatly stacked.

When a particular attenuator 42 is fully extended, the cycling and energy absorbing means 12 is prevented from leaving the open end 102 by engaging a cap 104 threaded onto an externally threaded collar 106 secured to the end 102 of the tubular member 34 by suitable weldments 108.

Although a number of different parameters will manifest themselves for the various components of each attenuator 42, an illustrative set of values is as follows:

The inner tubular member 18 may comprise a 17–7PH, heat treated, stainless steel, hollow, cylindrical body having a 0.025 inch wall thickness, as indicated by arrows 110 in FIGURE 8, an effective length of 12 inches and a 2.718-inch outside diameter at the end 94 tapering to a smaller diameter at the rate of 0.006 inch per foot in the direction of end 78.

The outer tubular member 34 may comprise a 17–7PH heat treated stainless steel, hollow cylindrical body having a 0.025-inch wall thickness and a 2.843-inch outside diameter.

The annular chamber 70 has a thickness of approximately 0.037-inch between the outer tubular member 34 and the inner tubular member 18 at the end 94 of the inner tubular member 18 with a corresponding increase in thickness at the rate of 0.006 inch per foot moving toward the end 78 to a maximum increase of 0.0015 inch.

The arcuate bodies 90 in the cages 72 and 73 are each made from a 302 stainless steel wire and are each approximately 0.0465 inch in diameter and 0.87 inch long. Six such bodies are provided in each of the cages 72, 73 and approximately 180 pounds of force are required to move each cage.

The helical coil 74 is made from a 302 stainless steel wire having approximately 0.045-inch diameter and includes approximately 80 turns 76. It requires approximately 200 pounds of force to rotate each turn about its internal axis. Since the chamber 70 has a maximum change in thickness of 0.0015 inch and the arcuate bodies 90 have a 0.0015-inch greater diameter than the turns 76, the cages 72, 73 will always be in working engagement with the members 18 and 34. This assures that the cages 72, 73 will always push the turns 76 during stroking of the attenuators 42.

The connector means 20 is secured to the end 94 of an associated attenuator 42 by a plug 112 which is secured in the open end 94 of the inner tubular member 18 by suitable weldments 114 and which includes an internally threaded counterbore 116 threadedly receiving the threaded end 46 of eye bolt 44.

The connector means 36 is secured to the end 118 of the outer tubular member 34 by an end cap 120 which is secured in the open end 118 by suitable weldments 122 and which includes an internally threaded couterbore 124 threadedly receiving the externally threaded end 46 of eye bolt 44. An air inlet valve 126 is mounted in the end cap 120 for introducing compressed air into the interior of the outer tubular member 34 for exerting a force against the closed bottom wall 84 of the end cap 80 for the purpose of extending the attenuator 42 after it has been compressed.

Additional embodiments of the present invention will now be described in connection with FIGURES 19 and 20 wherein an automobile 130 includes a chassis 132 and a body 134. The chassis 132 includes a frame 136 having parallel side members 138, a front end piece 140 and a rear end piece 142. The chassis also includes a pair of front wheels 144, a steering mechanism 146, a pair of rear wheels 148, a differential 150 and a drive shaft 152.

The automobile 130 is provided with an energy absorbing device 10a including a front bumper 154, a rear bumper 156, a left hand bumper 158 and a right hand bumper 160. The several bumpers are each connected to the frame 136 by attenuators 42, which may be identical to those previously described. The front bumper 154 includes an impact receiving means in the form of a bumper bar 16b of the wrap-around type having a front portion 162 connected to the front end piece 140 by four attenuators 42 and associated connector means 20 and 36, a right hand section 164 extending around the front of the automobile 130 to a point adjacent the right hand wheel 144, and a left hand section 166 extending around the left hand side of the automobile 130 to a point adjacent the left front wheel 144. The sections 164 and 166 are connected to the front ends 168 of their associated pair of attenuators 42 and connecting means 20 and 36. The bumpers 158 and 160 each include an impact receiving means in the form of a bumper bar 16c connected to an associated side member 138 by four attenuators 42 and associated connector means 20 and 36. The connector means 20, 36, which are identical to those described in connection with FIGURES 11–18, are connected to their associated bumper bars and the frame 136 at the same relative locations as those employed for the energy absorbing device 10. The attenuation of the driver of the automobile 130 through the energy absorbing device 10a will be apparent to those skilled in the art.

The automobile 130 also includes an energy absorbing device 10b including a U-shaped roll-bar comprising an impact receiving means 16c. The impact receiving means 16c includes a bight portion 172 and parallel arms 174. Each arm 174 may be provided with a tapered end 176 having a taper similar to that previously described in connection with the attenuator 42. A cycling and energy absorbing device 12 of the type previously described is provided in operative association with the end 176 of arm 174 and an outer tubular member 34b, which may be rigidly affixed to an associated side member 138. Should the vehicle 130 roll over, the driver will be attenuated through the energy absorbing device 10b by compressing the arms 174 into the outer tubular member 34b causing the cycling and energy absorbing device 12 to absorb the energy of the impact.

Referring now more in particular to FIGURES 19–24, the body 134 also includes a dashboard 178 to which the steering mechanism 146 is attached by a clamp 180. The steering mechanism 146 includes an energy absorbing device 10c comprising a cycling and energy absorbing means 12c and an energy transmitting means 14c. The energy transmitting means 14c includes an impact receiving means 16c, constituting a steering wheel for the automobile 130, an outer tubular member 34c and an inner tubular member 18c, constituting a steering column housing. The steering mechanism 146 also includes an upper steering shaft 182 operatively connected to the impact receiving means 16c and a lower steering shaft 184 operatively connected to the front wheels 144 for steering the automobile 130. The steering shafts 182 and 184 are telescopically connected together by a square end 186 on the upper shaft 182 which is reciprocably mounted in a mating square sleeve 188 on the lower shaft 184. The upper shaft 182 is rotatably mounted in a bearing 190 having an outer race 192 fitted in the open end 194 of the outer tubular member 34c and an inner race 196 encompassing the upper end 198 of the shaft 182. The lower shaft 184 is rotatably mounted in a bearing 200 having an outer race 202 frictionally fitted within the inner tubular member 18c and an inner race 204 frictionally fitting the lower steering shaft 184.

The cycling and energy absorbing means 12c may include a working cage 72 and a stacking cage 73 which are maintained in operative association with the inner tubular member 18c by the end cap 80 and the nut 104 and collar 106, respectively, all of which may be identical to the elements previously described in connection with FIGURE 6. The outer tubular member 34c and the inner tubular member 18c may be made of the same material and have substantially the same parameters as those previously described in connection with FIGURE 6. However, the increasing force with stroke is dispensed with. As herein shown and described, a controlled onset rate is incorporated into the energy absorbing device 10c by chemically-milling approximately 0.003 inch of material away from a 1½-inch-long section at the end 78c and approximately 0.002 inch away from a 1½-inch-long section 78d adjacent the end 78c. A first helical body 74c may then be mounted on the end 78c. A spacer member 206 may then be placed against the end 208 of the helical body 74c with a second helical body 74b placed against the end 210 of the spacer 206. The bodies 74c and 74b each have a plurality of turns 76 identical to those previously described. The onset rate of the energy absorbing device 10c may then be controlled by selecting a spacer 206 of a suitable width. For example, as herein shown, the spacer 206 maintains a predetermined number of turns 76c in the wide annular space 70c, where the most material was milled away from the end 78c and a second predetermined number of turns 76c in the portion of the annular chamber 70c formed by the milling of the 0.002 inch of material from the inner tubular member 18c. Also, a predetermined number of turns 76b will also be maintained in full working engagement with the inner tubular member 18c and the outer tubular member 34c. The spacer 206 controls the character of the onset force by programming the arrival of the individual turns 76 into working engagement with the inner tubular member 18c and the outer tubular member 34c wherein sufficient frictional force is involved to cause the individual turns 76 to rotate about their internal axes. It is apparent that the onset rate may be changed by choosing a different width for the spacer 206. Although this varying onset rate subjects a driver of the automobile 130 to less initial shock, is requires an increased stroking distance for the energy absorbing device 10c. This stroking distance may be minimized by eliminating the chemical milling process and the spacer 206 so that all turns 76 will always be in working engagement. In this case, it may be desirable to lessen the shock of the initial impact on the driver of the vehicle 130 by providing an elastomeric attenuator 212 in the hub portion 204 of the impact receiving means 16c to absorb some of the initial shock as the driver strikes the impact receiving means 16c driving it against the end 194 of the outer tubular member 34c causing it to move in the direction of arrow 216 for cycling the cycling and energy absorbing means 12c. The driver may be additionally attenuated through the clamp 180 by having it frictionally engage the outer tubular member 34c in such a manner that it requires a predetermined force to move the outer tubular member 34c in the direction of arrow 216.

The steering mechanism 146 is designated for use in those steering systems wherein an outer, non-rotatable steering column houses the rotating portion of the steering system. In those steering systems where it is permissible to have the rotating portion of the system exposed, a modified steering mechanism 14a (FIGURES 25–27) may be used. The steering mechanism 146a includes an impact receiving means 16d in the form of a steering wheel which may be non-rotatably connected to an internal tubular member 18d which is telescopically received in an outer tubular member 34d having a splined shaft 216 affixed to the end 218 thereof. The splined shaft 216 is operatively associated with the customary steering gears which may be housed in a housing represented by the broken line 220.

The steering mechanism 146a also includes a cycling and energy absorbing means 12d which may be identical to the cycling and energy absorbing means 12c previously described except that a predetermined number of turns 76d may be provided with spherical elements 222 disposed within fluted chambers 224 for non-rotatably connecting the inner tubular member 18d to the outer tubular member 34d while permitting relative reciprocation between the two members. The fluted chambers 224 may be formed by axially extending, arcuate channels 226 formed in the outer tubular member 34d, and matching channels 228 formed in the internal tubular member 18d.

Referring now to FIGURES 28–31, a modified energy absorbing device 10e includes a first-stage cycling and energy absorbing means 12f, a second-stage cycling and energy absorbing means 12e, a first-stage energy transmitting means 14f, and a second-stage energy transmitting means 14e. The second-stage energy transmitting means 14e includes an impact receiving means 16e constituting the floor of an elevator 230 adapted to operate within an elevator shaft 232 in well known manner. The energy absorbing device 10e is adapted for use as an attenuator for the elevator 230 should it free-fall within the shaft 232. The energy absorbing device 10e is designed to impart to the elevator 230 an average retardation not in excess of 32.2 ft./sec.$^2$ — i.e. two g's, and is adapted to develop no peak retardation greater than 80.5 ft./sec.$^2$ (3.5 g's) having a duration exceeding $\frac{1}{25}$ of a second with any load in the elevator 230 from rated load to a minimum load of 150 lbs.

Assuming that the elevator 230 has an empty weight of 5000 lbs. and a full weight of 8000 lbs. which is counterbalanced by 40%, then the effective empty weight is 3000 lbs. and the effective full weight is 6000 lbs.

With an empty elevator, the energy required to stop the elevator with an average retardation not in excess of 2 g's will be 6000 lbs. (the empty weight×2)×$S_1$, where $S_1$ is the stroke which satisfies the proper impact velocity for the empty elevator 230 using constant-load, single-stage attenuation.

Under the full weight condition where the effective weight is 6000 lbs. and the average retardation is not to exceed 2 g's, the energy required to arrest the full elevator is 12,000 lbs.×$S_1$−6000×$S_1$, the energy absorbed by the first stage. Therefore, in terms of stroke $S_1$, the additional energy to be absorbed is 6000 $S_1$.

Although the maximum g's tolerable is 3.5, assume a 10 percent safety factor and let the maximum g's tolerable be 0.90×3.5=3.15. On this basis, maximum load tolerable by the energy absorbing device 10e will be 6000 lbs. ×3.15=18,900 lbs.

Assuming that the additional energy required for the additional weight to be taken out by a linearly increasing curve starting from 6000 lbs. to 18,900 lbs., then the stroke required in terms of the stroke distance X, $S_1$ for empty car) can be detemined as follows:

$$6000 \ S_1 = \left(\frac{6000+18,900}{2}\right) \cdot X$$

$$X = \frac{12,000 \ S_1}{24,900}$$

$$= 0.4819 \ S_1$$

In terms of stroke, $S_1$, additional energy to be absorbed by the second stage is 3000 $S_1$. Whether or not the criteria for the full weight load-stroke curve is compatible with the intermediate weight condition may be determined by first determining the additional stroke length (required by the second stage) in terms of the first-stage stroke-length $S_1$ required to absorb the additional energy due to half weight condition.

$$3000 \ S_1 = \frac{\left(6000 + \frac{26,769 \cdot X}{S_1}\right) X}{2}$$

$$6000 \ S_1 = 6000 \cdot X + 26,769 \cdot \frac{X^2}{S_1}$$

$$26,769 \left(\frac{X}{S_1}\right)^2 + 6000 \left(\frac{X}{S_1}\right) - 6000 = 0$$

To solve for X, let:

$$a = 26,769$$

$$b = 6000$$

$$c = -6000$$

Then, $$X = \frac{-b + \sqrt{b^2 - 4ac}}{2a}$$

$$= \frac{-6000 + \sqrt{36,000,000 + 4(26,769)6000}}{2(26,769)}$$

$$= 0.37444$$

Thus, the maximum load for a car half full is:

$$(L_{\max.}) = 6000 + 26,769(0.37444) \text{ half full}$$

$$= 16,023$$

The peak g's is then:

$$\frac{16,023}{4500} = 3.5607$$

Thus, the energy absorbing device 10e meets the requirements. The foregoing principles are illustrated graphically in FIGURE 28 wherein the energy absorbed by the first-stage cycling and energy absorbing means 12f having a stroke $S_1$ is represented by the area enclosed within the rectangle 234 and the energy absorbed by the second-stage cycling and energy absorbing means 12e having a stroke of 0.5 $S_1$ is represented by the area 236 under the sloped line 238 having a slope of $$18,900 - 600/0.5 \ S_1 = 26,769/S_1$$

The first-stage cycling and energy absorbing means 12f may be identical to that described in connection with the cycling and energy absorbing device 12 and is in operative association with an inner tubular member 18f and an outer tubular member 34f, neither of which are tapered. Should the elevator 230 be empty, the first-stage cycling and energy absorbing means 12f will absorb sufficient energy to stop the elevator 230 before the end 240 bottoms out on the end wall 242 of the outer tubular member 34f. However, should the elevator 230 contain passengers, increased weight will cause the inner tubular member 18f to bottom out on the end wall 242 putting the second-stage cycling and energy absorbing means 12e into operation. This cycling and energy absorbing means may also be identical to that disclosed in connection with the energy absorbing means 12 and is fitted on a tapered end 244 of the outer tubular member 34f so that the onset rate for the cycling and energy absorbing means 12e will conform to the slope of the line 238 in the graph shown in FIGURE 28.

The second-stage cycling and energy absorbing means 12e is in working engagement with the tapered portion 244 of the outer tubular member 34f and a second outer tubular member 246 which may be affixed to the impact receiving means 16e by suitable bolt means 248.

While the particular energy absorbing devices herein shown, are described in detail, are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. An energy absorbing device adapted to absorb unidirectional mechanical energy by cyclic plastic deformation, comprising:
   cycling and energy absorbing means for absorbing energy by a plastic deformation and a reversed plastic deformation of the same portions thereof in response to mechanical energy transmitted thereto, said cycling and energy absorbing means being adapted to convert unidirectional mechanical energy into its cyclic plastic deformation and reversed deformation;

energy transmitting means for transmitting said mechanical energy to said cycling and energy absorbing means; and means for progressively subjecting additional portions of said energy absorbing means to cyclic deformation in response to a predetermined unidirectional operation of said transmitting means.

2. An energy absorbing device as stated in claim 1 wherein said energy transmitting means includes impact receiving means comprising a highway guard rail member.

3. An energy absorbing device as stated in claim 1 wherein said energy transmitting means includes an impact receiving means comprising an automobile steering wheel.

4. An energy absorbing device as stated in claim 1 wherein said energy transmitting means includes an impact receiving means comprising an automobile roll-bar.

5. An energy absorbing device as stated in claim 1 wherein said energy transmitting means includes an impact receiving means comprising an elevator floor.

6. An energy absorbing device as stated in claim 1 wherein said cycling and energy absorbing means comprises a solid, nonelastomeric, radially uncompressed, arcuate body capable of being rotated about its internal axis for absorbing energy by alternate plastic tension deformation and plastic compression deformation of the same portion thereof during each cycle transmitted thereby by said energy transmitting means.

7. An energy absorbing device as stated in claim 1 wherein said cycling and energy absorbing means includes a working cage, a helical body and a stacking cage.

8. An energy absorbing device as stated in claim 1 wherein said energy transmitting means comprises:

an inner tubular member having a tapered end with which said cycling and energy absorbing means is operatively associated;

an outer tubular member encompassing said tapered end in operative association with said cycling energy absorbing means; and connector means connecting one of said tubular members to an impact receiving means, said onset rate control means comprising a varying annular chamber formed by said tapered end and said outer tubular member.

9. An energy absorbing device as stated in claim 8 wherein said impact receiving means comprises highway guard rail means.

10. An energy absorbing device as stated in claim 8 wherein said impact receiving means comprises an automobile bumper bar.

11. An energy absorbing device as stated in claim 8 wherein said impact receiving means comprises a roll-bar on an automobile.

12. An energy absorbing device as stated in claim 8 wherein said impact receiving means comprises an elevator.

13. An energy absorbing device as stated in claim 8 wherein said impact receiving means comprises a steering wheel on an automobile.

14. An energy absorbing device as stated in claim 13 wherein said connector means includes an elastomeric energy absorber operatively associating said steering wheel with said one tubular member.

15. An energy absorbing device adapted to absorb unidirectional mechanical energy by cyclic plastic deformation of portions thereof comprising:

an outer tubular member;

an inner tubular member telescopically received in and relatively axially movable in said outer tubular member and defining therewith an annular chamber, different axial portions of said chamber being of different radial width;

cycling and energy absorbing means mounted in said chamber for absorbing energy by a deformation and a reversed deformation in response to mechanical energy transmitted thereto by relative axial movement of said tubular members, different portions of said cycling and energy absorbing means being subjected to said plastic deformation at a rate controlled by said different widths of said portions of said chamber.

References Cited

UNITED STATES PATENTS

| | | | |
|---|---|---|---|
| 2,819,060 | 1/1958 | Neidhart. | |
| 3,141,655 | 7/1964 | Platt. | |
| 3,167,974 | 2/1965 | Wilfert | 74—492 X |
| 3,209,864 | 10/1965 | Boyd | 188—1 |
| 3,231,049 | 1/1966 | Platos et al. | 188—1 |
| 3,307,868 | 3/1967 | Blank | 188—1 X |

DUANE A. REGER, *Primary Examiner.*